US011405536B2

(12) United States Patent
Nakamura (10) Patent No.: US 11,405,536 B2
(45) Date of Patent: Aug. 2, 2022

(54) IMAGING DEVICE

(71) Applicant: Nidec Copal Corporation, Tokyo (JP)

(72) Inventor: Yuta Nakamura, Tokyo (JP)

(73) Assignee: NIDEC COPAL CORPORATION, Tokyo (JP)

(*) Notice: Subject to any disclaimer, the term of this patent is extended or adjusted under 35 U.S.C. 154(b) by 180 days.

(21) Appl. No.: 16/758,399

(22) PCT Filed: Aug. 30, 2018

(86) PCT No.: PCT/JP2018/032196
§ 371 (c)(1),
(2) Date: Apr. 23, 2020

(87) PCT Pub. No.: WO2019/082506
PCT Pub. Date: May 2, 2019

(65) Prior Publication Data
US 2020/0252527 A1    Aug. 6, 2020

(30) Foreign Application Priority Data
Oct. 27, 2017    (JP) .............................. JP2017-208217

(51) Int. Cl.
*H04N 5/225*    (2006.01)
*G02B 1/11*    (2015.01)
(Continued)

(52) U.S. Cl.
CPC ............. *H04N 5/2254* (2013.01); *G02B 1/11* (2013.01); *G02B 13/001* (2013.01); *G03B 17/08* (2013.01);
(Continued)

(58) Field of Classification Search
CPC .......... G02B 13/001; G02B 1/11; G02B 7/02; G03B 17/02; G03B 17/08; G03B 30/00;
(Continued)

(56) References Cited

U.S. PATENT DOCUMENTS

2005/0275750 A1* 12/2005 Akram .............. H01L 27/14634
257/E31.127
2006/0061889 A1* 3/2006 Tan ..................... H01L 31/0203
257/E31.127
(Continued)

FOREIGN PATENT DOCUMENTS

JP    2010-252307 A    11/2010
JP    2011-164461 A    8/2011
(Continued)

OTHER PUBLICATIONS

International Search Report in PCT/JP2018/032196, dated Nov. 6, 2018. 4pp.

*Primary Examiner* — Amy R Hsu
(74) *Attorney, Agent, or Firm* — Hauptman Ham, LLP (57) ABSTRACT

An imaging device includes an image sensor that captures an image of a subject, a first substrate on which the image sensor is mounted, a second substrate located frontward from the first substrate in an optical axis direction and having a first opening, and a lens barrel holding a lens. The image sensor receives light passing through the lens and the first opening.

7 Claims, 10 Drawing Sheets (51) Int. Cl.
*G02B 13/00* (2006.01)
*G03B 17/08* (2021.01)

(52) U.S. Cl.
CPC ......... *H04N 5/2252* (2013.01); *H04N 5/2253* (2013.01)

(58) Field of Classification Search
CPC ... H04N 5/2252; H04N 5/2253; H04N 5/2254
See application file for complete search history.

(56) References Cited

U.S. PATENT DOCUMENTS

| | | | |
|---|---|---|---|
| 2009/0128681 A1* | 5/2009 | Kim | H04N 5/2257 348/335 |
| 2011/0199485 A1 | 8/2011 | Nakamura | |
| 2011/0298925 A1 | 12/2011 | Inoue et al. | |
| 2014/0179999 A1 | 6/2014 | Igarashi et al. | |
| 2018/0108697 A1* | 4/2018 | Matsugai | G02B 13/0085 |
| 2019/0075223 A1* | 3/2019 | Chen | H04N 5/2253 |
| 2019/0387136 A1* | 12/2019 | Ahn | B60R 1/00 |

FOREIGN PATENT DOCUMENTS

| | | |
|---|---|---|
| JP | 2011-259101 A | 12/2011 |
| JP | 2013-48826 A | 3/2013 |
| JP | 2014-157309 A | 8/2014 |
| WO | 2007/097155 A1 | 8/2007 |

* cited by examiner

IMAGING DEVICE

RELATED APPLICATIONS

The present application is National Phase of International Application Number PCT/JP2018/032196, filed Aug. 30, 2018, and claims priority based on Japanese Patent Application No. 2017-208217, filed Oct. 27, 2017.

FIELD

An embodiment of the present invention relates to, for example, an imaging device.

BACKGROUND

Imaging devices known and used widely may include a case accommodating a lens barrel holding a lens and a substrate on which an image sensor is mounted. Such imaging devices are increasingly incorporated in automobiles or other machines. Examples of such techniques for imaging devices include devices described in Patent Literatures 1 and 2.

CITATION LIST

Patent Literature

Patent Literature 1: Japanese Unexamined Patent Application Publication No. 2011-164461
Patent Literature 2: Japanese Unexamined Patent Application Publication No. 2011-259101

BRIEF SUMMARY

Technical Problem

Imaging devices nowadays are incorporated in various machines such as automobiles and surveillance cameras. Such machines may have a highly limited space for an imaging device, which is thus to be smaller. A smaller imaging device may be located closer to other electronic components, possibly generating more electromagnetic noise to be avoided. Such electromagnetic noise is avoided to prevent electromagnetic noise generated in the imaging device from affecting other devices.

Solution to Problem

In response to the above issue, one or more aspects of the present invention are directed to the structures described below. The reference numerals or other labels in parentheses herein denote the corresponding components in the figures to facilitate understanding of the aspects of the present invention. However, the components with such reference numerals do not limit the components according to the aspects of the present invention, which should be construed broadly within the scope technically understandable by those skilled in the art.

An imaging device according to one aspect of the present invention includes an image sensor (511) that captures an image of a subject, a first substrate (51) on which the image sensor is mounted, a second substrate (52) located frontward from the first substrate in an optical axis direction and having a first opening (52a), and a lens. The image sensor (511) receives light passing through the lens and the first opening (52a).

The imaging device with the above structure includes the second substrate having no image sensor between the first substrate on which the image sensor is mounted and the lens. The imaging device thus has a smaller dimension (thickness) in the optical axis direction than an imaging device including a second substrate located rearward from a first substrate in the optical axis direction.

In the above imaging device, the first opening (52a) may have an edge that allows, for the light passing through the lens, passage of a portion of the light corresponding to an effective imaging region to be received by the image sensor.

The imaging device with the above structure prevents light coming from the subject to form an image in the image sensor from being blocked at the first opening. This allows clear imaging of the entire subject.

In the above imaging device, the first opening (52a) may be rectangular.

The imaging device with the above structure allows, for example, an appropriate amount of light corresponding to a rectangular imaging area to pass through the first opening.

The above imaging device may further include a shield plate (61 or 62) located between the first substrate and the second substrate and having a second opening (61a or 62b).

In the above structure, the shield plate blocks electromagnetic noise generated from either the first substrate or the second substrate toward the other, thus reducing inappropriate, erroneous operations of the first substrate and second substrate due to such electromagnetic noise.

In the above imaging device, the shield plate (61 or 62) may include leaf springs (61b, 61c or 62b, 62c) in contact with the first substrate and the second substrate and urging the first substrate and the second substrate.

The imaging device with the above structure stably positions the first substrate and the second substrate under the urging force applied from the leaf springs.

In the above imaging device, the leaf springs (61b, 61c or 62b, 62c) may each urge the first substrate or the second substrate in the optical axis direction.

In the above structure, the leaf springs urge the first substrate and the second substrate away from each other, stably positioning the first substrate and the second substrate.

In the above imaging device, the shield plate (62) may have a surface treated with anti-reflective surface treatment.

In the above structure, the shield plate can reduce reflection of light, reducing ghosting flare or other artifacts appearing on the captured image due to light reflected on the shield plate.

In the above imaging device, the shield plate may have a front surface in the optical axis direction treated with anti-reflective surface treatment.

In the above structure, the shield plate can reduce reflection of light coming from the subject on its surface that may cause defects, thus reducing ghosting flare or other artifacts.

In the above imaging device, the second opening (62a) may be smaller than the first opening (52a).

The imaging device with the above structure can block, at the second opening, light not used to form an image, and thus more effectively reduce ghosting flare or other artifacts.

DETAILED DESCRIPTION

An imaging device according to one or more embodiments of the present invention includes two substrates, or specifically a first substrate and a second substrate. The second substrate is located between the first substrate on which an image sensor is mounted and a lens. This structure has a smaller dimension (thickness) in the optical axis direction. Specific examples of the structure according to the embodiments of the present invention will now be described. The embodiments described below are mere examples of the present invention, and should not be construed as limiting the technical scope of the invention. In the figures, the same components are given the same reference numerals, and may not be described.

1. First Embodiment
2. Second Embodiment
3. Third Embodiment
4. Features
5. Supplemental Examples An optical axis herein refers to the center of a lens incorporated in the imaging device, and also the center of light entering the image sensor. A subject herein refers to an imaging target located opposite to the image sensor from the lens. The front or frontward in the optical axis direction refers to the direction in which the subject is located as viewed from the image sensor, whereas the rear or rearward in the optical axis direction refers to the direction in which the image sensor is located as viewed from the subject.

1. First Embodiment

Figure 1:
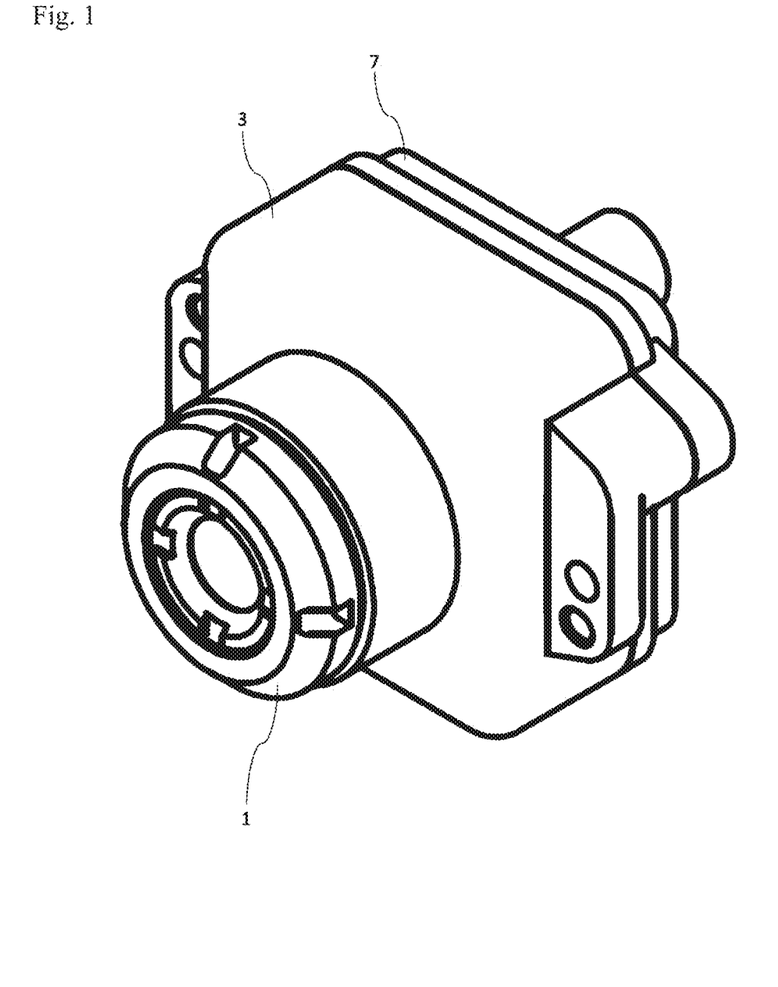
FIG. 1 is an external front perspective view of an imaging device according to a first embodiment.
Figure 2:
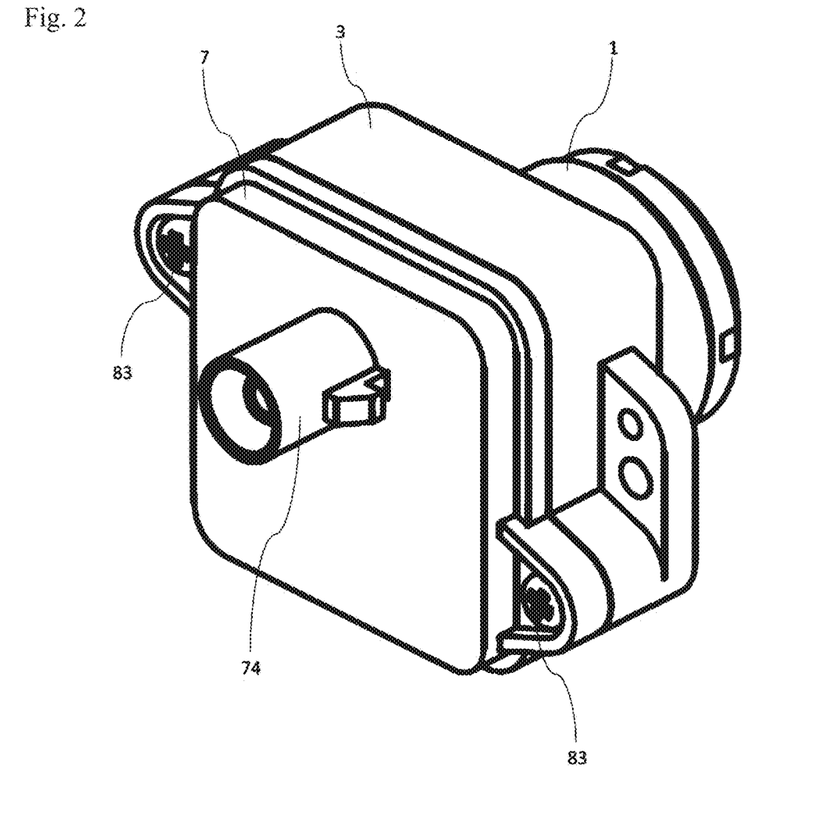
FIG. 2 is an external rear perspective view of the imaging device according to the first embodiment.
Figure 3:
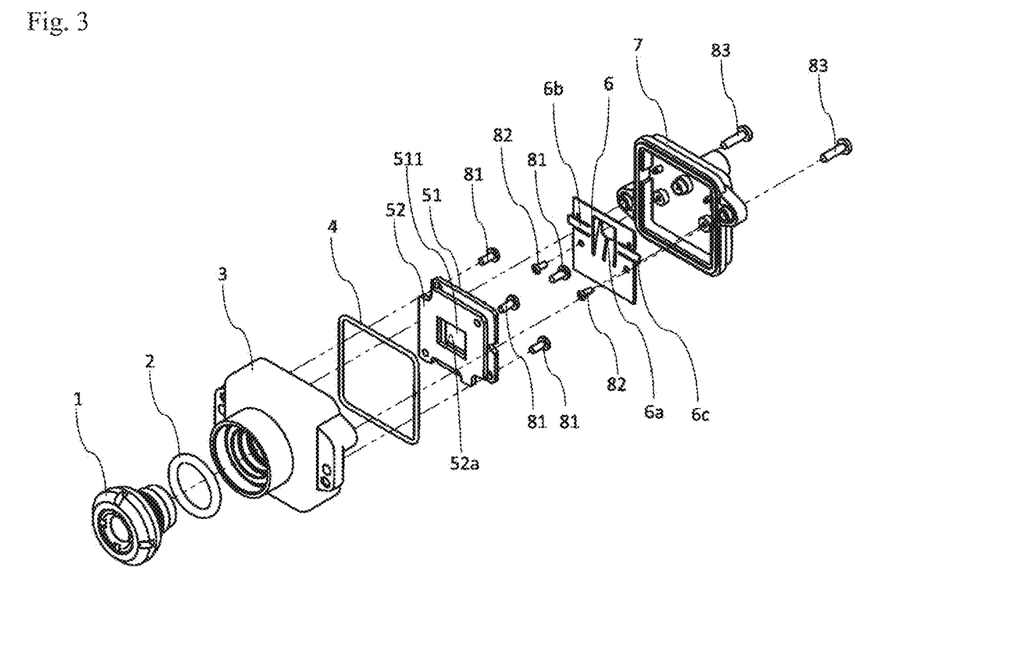
FIG. 3 is an exploded front perspective view of the imaging device according to the first embodiment.
Figure 4:
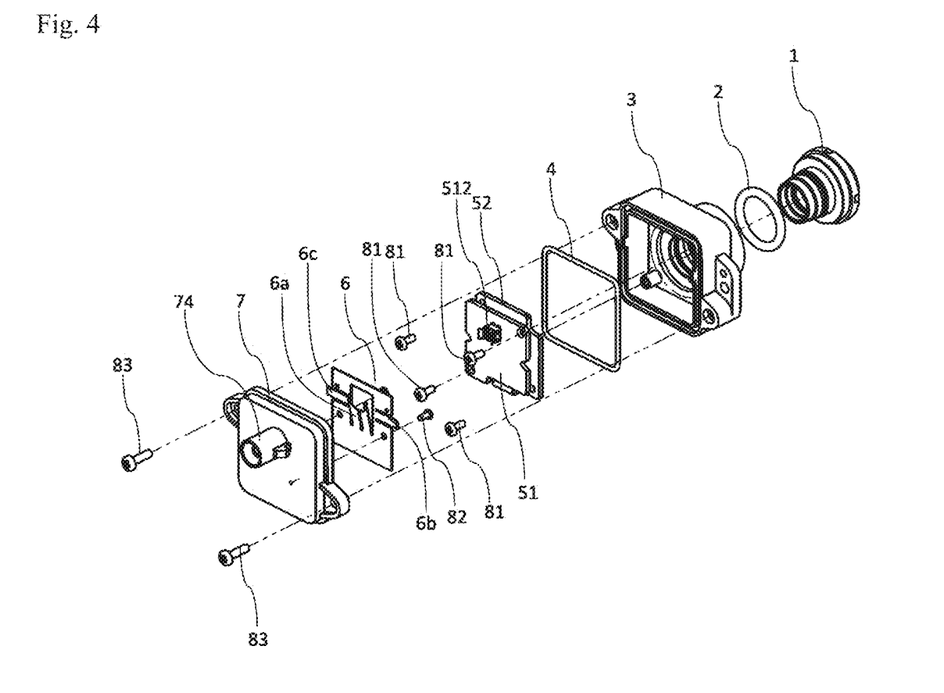
FIG. 4 is an exploded rear perspective view of the imaging device according to the first embodiment.
Figure 5:
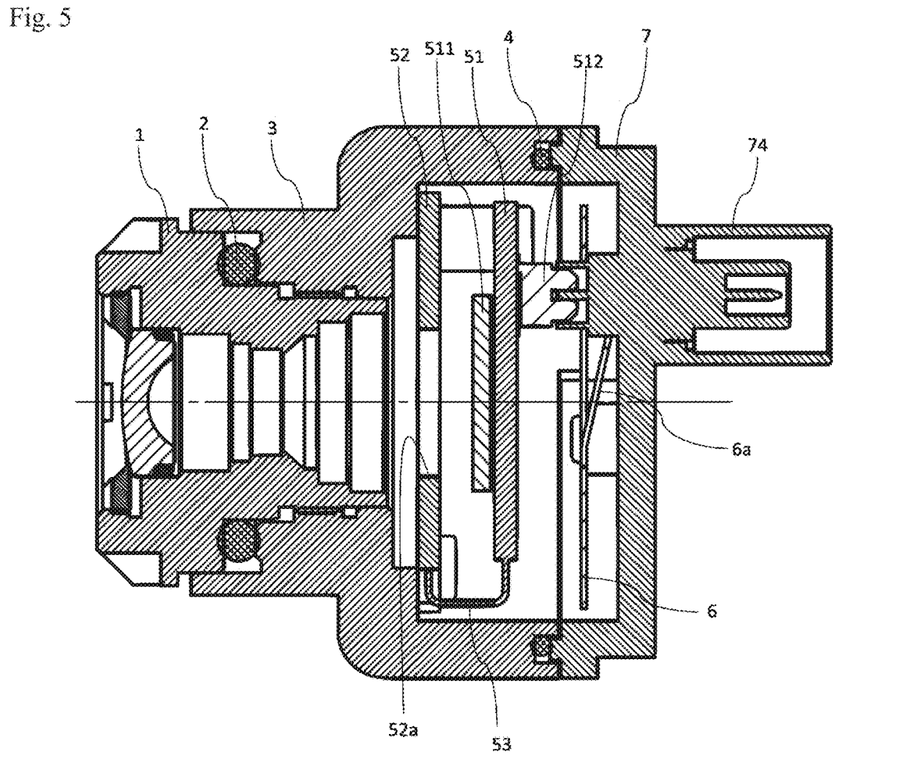
FIG. 5 is a cross-sectional view of the imaging device according to the first embodiment.

A first embodiment of the present invention will be described with reference to FIGS. 1 to 5. FIGS. 1 and 2 are external views of an imaging device. FIG. 1 is a front view, and FIG. 2 is a rear view. FIGS. 3 and 4 are exploded perspective views of the imaging device. FIG. 3 is a front view, and FIG. 4 is a rear view. FIG. 5 is a cross-sectional view of the imaging device.

As illustrated, the imaging device according to the present embodiment includes a lens barrel 1, a waterproof seal 2, a front case 3, a waterproof seal 4, a first substrate 51, a second substrate 52, a shield plate 6, and a rear case 7.

Front Case 3

The front case 3, together with the rear case 7, forms a housing (case) accommodating the imaging device. The front case 3 is formed from, for example, a metal or a resin. The front case 3 has an opening facing frontward along the optical axis and having the optical axis at the center. The front case 3 has its rear part in the optical axis direction open for connection to the rear case 7. The front case 3 has substantially rectangular circumferential surfaces that cover the optical axis at the rear part. The front case 3 is connected with the rear case 7 to define an internal space for accommodating the lens barrel 1, the first substrate 51, the second substrate 52, the shield plate 6, and other components. As shown in FIG. 1, the front case 3 holds the lens barrel 1 in its opening facing frontward in the optical axis direction. The waterproof seal 2 is placed between the front case 3 and the lens barrel 1.

Rear Case 7

As described above, the rear case 7 is connected with the front case 3 to define the space for accommodating the lens barrel 1, the first substrate 51, the second substrate 52, the shield plate 6, and other components. The rear case 7 has its front part in the optical axis direction having substantially the same shape as the rear part of the front case 3 in the optical axis direction. When assembled, the rear case 7 is connected with the front case 3 with fasteners 83. The waterproof seal 4 is placed between the rear case 7 and the front case 3.

The rear case 7 includes, at the rear in the optical axis direction, a connector unit 74 for connecting a connector 512 on the first substrate 51 to an external device. The connector unit 74 is a cylinder protruding rearward in the optical axis direction.

Lens Barrel 1

The lens barrel 1 is a cylinder elongated along the optical axis and holds one or more optical members including a lens. The lens barrel 1 may hold optical members including a spacer, aperture blades, and an optical filter, in addition to one or more lenses. The lenses are formed from a transparent material, such as glass or plastic, to transmit light from the front to the rear in the optical axis direction while refracting the light. The spacer is an annular plate with an appropriate thickness in the optical axis direction. The spacer adjusts the positions of the lenses in the optical axis direction. The spacer has an opening in the middle including the optical axis. The aperture blades determine the outermost position of passing light. The optical filter prevents or blocks passage of light with a predetermined wavelength. The optical filter may include, for example, an infrared cut-off filter that prevents infrared rays from passing. The number and types of optical members used can be changed as appropriate.

Waterproof Seal 2

The waterproof seal 2 is annular, and is formed from an elastic material, such as rubber. The waterproof seal 2 is placed between the front case 3 and the lens barrel 1 to connect the front case 3 to the lens barrel 1 with no gap between them. The waterproof seal 2 is annular in conformance with the outer rim of the opening in the front case 3.

Waterproof Seal 4

The waterproof seal 4 is rectangular, and is formed from an elastic material, such as rubber. The waterproof seal 4 is placed between the front case 3 and the rear case 7 to connect the front case 3 to the rear case 7 with no gap between them. The waterproof seal 4 is rectangular in conformance with the contour of the open rectangular rear part of the front case 3 and with the contour of the open rectangular front part of the rear case 7 in the optical axis direction.

The rear opening of the front case 3 and the front opening of the rear case 7 in the optical axis direction and the waterproof seal 4 each may not be rectangular and may be, for example, circular or polygonal.

First Substrate 51

The first substrate 51 is a rigid substrate on which an image sensor 511 is mounted. The first substrate 51 may receive an electronic component other than the image sensor 511. The first substrate 51 has a rear surface in the optical axis direction on which a connector 512 is mounted. The first substrate 51 has a front surface in the optical axis direction on which the image sensor 511 is mounted. The first substrate 51 extends along a plane perpendicular to the optical axis to allow light to enter the image sensor 511 during image capturing. The image sensor 511 receives light passing through the lens and other components in the lens barrel 1 and an opening 52a in the second substrate 52. The first substrate 51 and the second substrate 52 are electrically connected with a flexible substrate 53. The flexible substrate 53 is flexible, and electrically connects the first substrate 51 with the second substrate 52. Electrical signals obtained by the image sensor 511 undergo predetermined electric or signal processing performed by the electronic components on the first substrate 51 and the second substrate 52. The processed signals are then output from the connector 512 through the connector unit 74 in the rear case 7 to a device external to the imaging device as image data. The first substrate 51 is connected with the front case 3 and secured in position with multiple fasteners 81.

Image Sensor 511

The image sensor 511 is a photoelectric converter that converts incident light to electrical signals. The image sensor 511 is, for example, a complementary metal-oxide-semiconductor (CMOS) sensor or a charge-coupled device (CCD), but is not limited to such devices. The image sensor 511 receives light passing through the opening 52a in the second substrate 52. The imaging device may include an imaging unit having the imaging function other than the image sensor 511.

Second Substrate 52

The second substrate 52 is a rigid substrate on which an electronic component is mounted. The second substrate 52 extends along a plane perpendicular to the optical axis in the same manner as the first substrate 51. More specifically, the first substrate 51 and the second substrate 52 are parallel to each other. The second substrate 52 is located frontward from the first substrate 51 in the optical axis direction. More specifically, the second substrate 52 is located between the first substrate 51 and the lens barrel 1.

The second substrate 52 has the rectangular opening 52a with the optical axis at the center. Light passing through the lens and other components in the lens barrel 1 then passes through the opening 52a. The opening 52a has an edge that allows passage of a portion of light corresponding to an effective imaging region to form an image in the image sensor 511. Light not used to form an image in the image sensor 511 may be blocked at the opening 52a or may pass through the opening 52a. The opening 52a is an example of a first opening in an aspect of the present invention.

Shield Plate 6

The shield plate 6 is a plate of, for example, conductive metal. The shield plate 6 is located more rearward than the first substrate 51 in the optical axis direction. More specifically, the shield plate 6 is located between the first substrate 51 and the rear case 7. The shield plate 6 includes leaf springs 6a, 6b, and 6c. The leaf spring 6a urges the rear case 7 away from the shield plate 6. More specifically, the leaf spring 6a urges the rear case 7 and the shield plate 6 away from each other. The leaf springs 6b and 6c urge the first substrate 51 away from the rear case 7. More specifically, the leaf springs 6b and 6c urge the first substrate 51 and the shield plate 6 away from each other. The shield plate 6 is connected with the rear case 7 and secured in position with multiple fasteners 82.

The shield plate 6 may be electrically connected to a ground potential. For example, the leaf springs 6b and 6c on the shield plate 6 may be in contact with a pattern of a ground potential of at least one of the first substrate 51 and the second substrate 52, causing the entire shield plate 6 to have the ground potential.

2. Second Embodiment

A second embodiment of the present invention will now be described with reference to FIGS. 6 to 9. The imaging device according to the present embodiment differs from the imaging device according to the first embodiment in including a shield plate 61. The present embodiment will be described focusing on its differences from the first embodiment. The same components as in the first embodiment will not be described.

Figure 6:
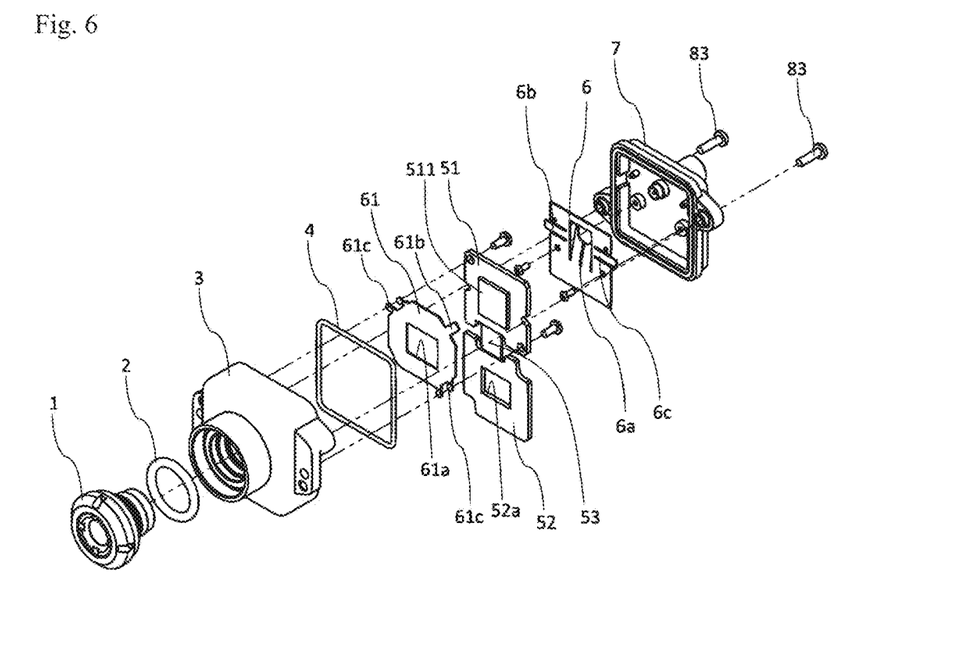
FIG. 6 is an exploded front perspective view of an imaging device according to a second embodiment.
Figure 7:
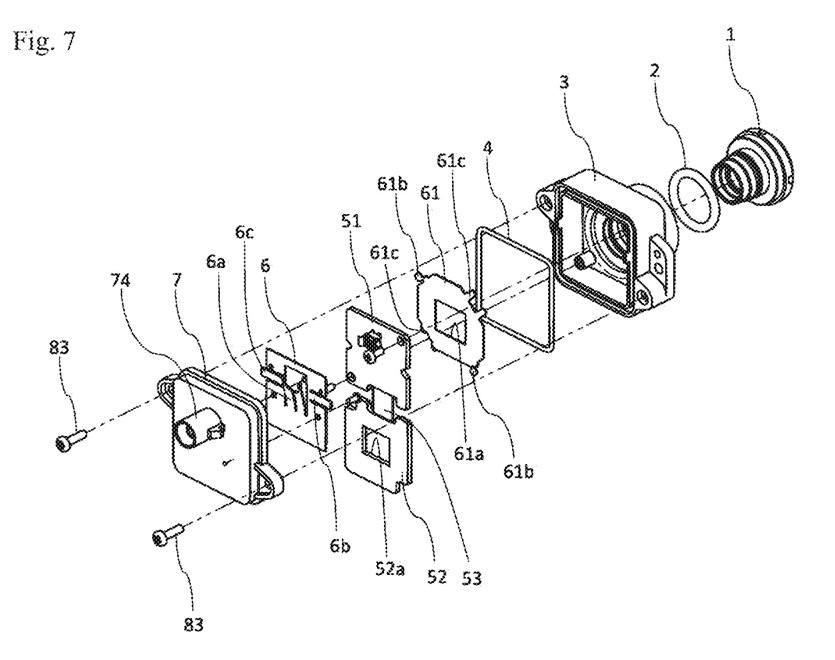
FIG. 7 is an exploded rear perspective view of the imaging device according to the second embodiment.
Figure 8:
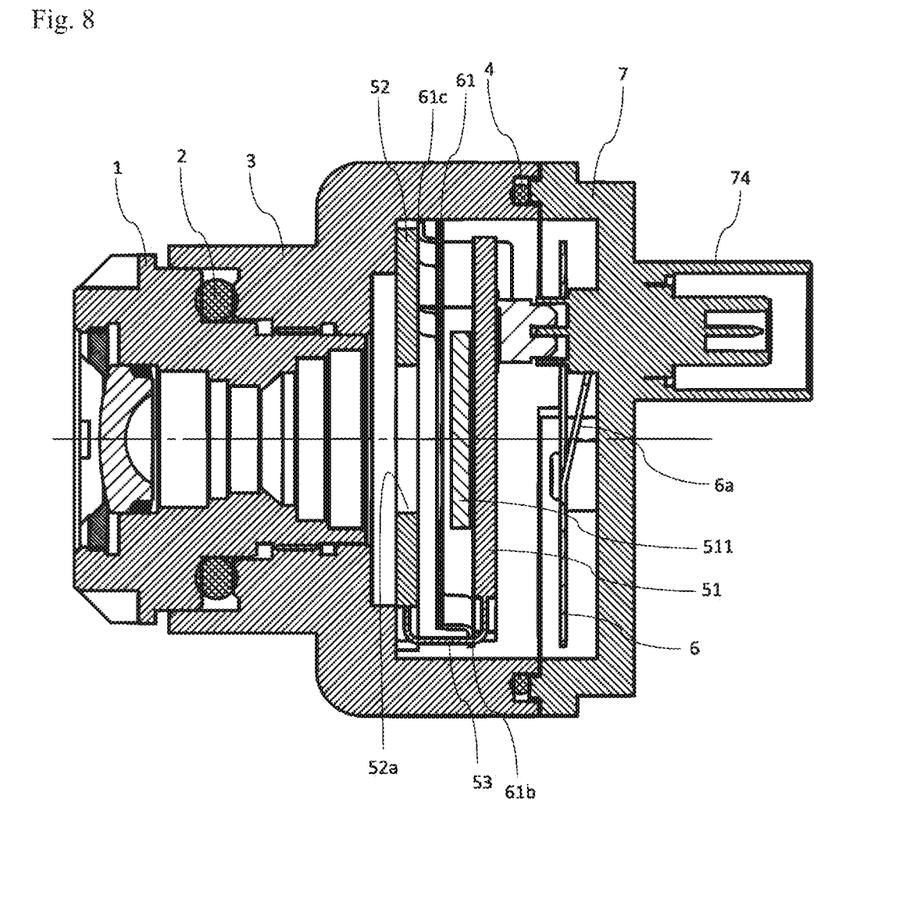
FIG. 8 is a cross-sectional view of the imaging device according to the second embodiment.
Figure 9:
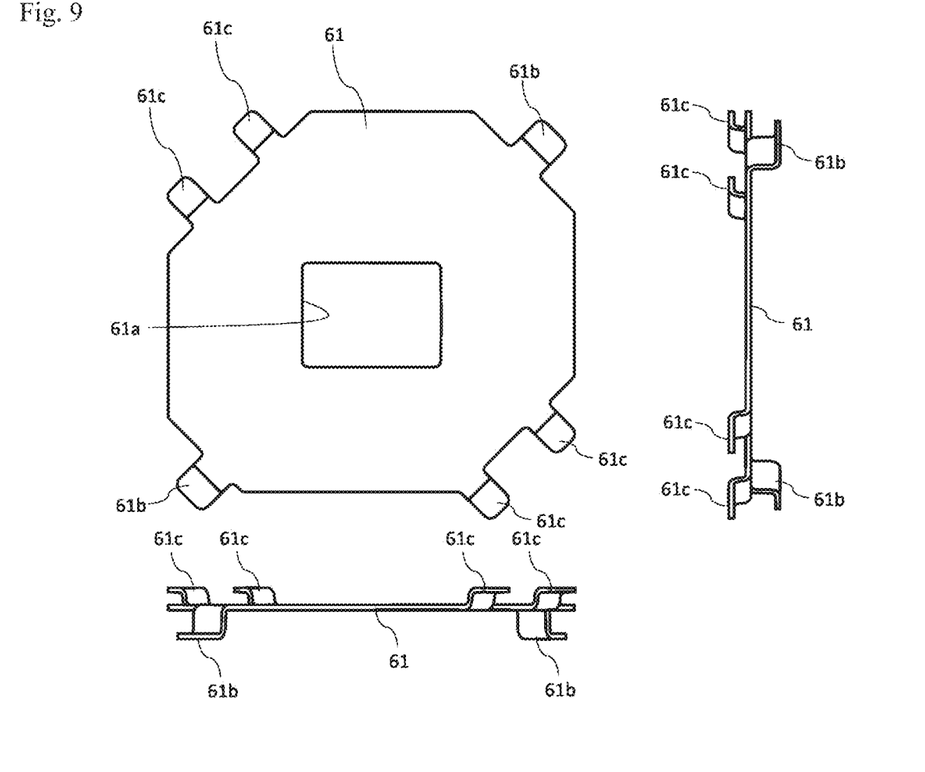
FIG. 9 is an enlarged view of a shield plate.

FIGS. 6 and 7 are exploded perspective views of the imaging device according to the present embodiment. FIG. 6 is a front view, and FIG. 7 is a rear view. FIGS. 6 and 7 correspond to FIGS. 3 and 4 referred to in the first embodiment. FIG. 8 is a cross-sectional view of the imaging device according to the present embodiment. FIG. 9 includes three views of a shield plate 61.

As illustrated, the imaging device according to the present embodiment further includes a shield plate 61, in addition to a lens barrel 1, a waterproof seal 2, a front case 3, a waterproof seal 4, a first substrate 51, a second substrate 52, the shield plate 6, and a rear case 7.

Shield Plate 61

Similarly to the shield plate 6, the shield plate 61 is a plate of, for example, conductive metal. As shown in FIG. 8, the shield plate 61 is located frontward from the first substrate 51 in the optical axis direction and rearward from the second substrate 52 in the optical axis direction. More specifically, the shield plate 61 is located between the first substrate 51 and the second substrate 52. The shield plate 61 has a rectangular opening 61a with the optical axis at the center. The opening 61a has an edge that allows passage of a portion of light corresponding to an effective imaging region to form an image in the image sensor 511. The opening 61a is an example of a second opening in an aspect of the present invention.

As shown mainly in FIG. 9, the shield plate 61 includes leaf springs 61b and 61c. The leaf springs 61b are located diagonally at the corners of the rectangular shield plate 61. The leaf springs 61c are located diagonally at the other corners of the rectangular shield plate 61 having no leaf springs 61b. The leaf springs 61b protrude rearward from a plate portion of the shield plate 61 in the optical axis direction and are in contact with a front surface of the first substrate 51 in the optical axis direction. The leaf springs 61c protrude frontward from the plate portion of the shield plate 61 in the optical axis direction and are in contact with a rear surface of the second substrate 52 in the optical axis direction. More specifically, the leaf springs 61b urge the first substrate 51 rearward in the optical axis direction and the leaf springs 61c urge the second substrate 52 frontward in the optical axis direction. As described above, the leaf springs 61b and 61c on the shield plate 61 each urge the first substrate 51 or the second substrate 52 in the optical axis direction. This structure can stably position the first substrate 51, the second substrate 52, and the shield plate 61.

3. Third Embodiment

A third embodiment of the present invention will now be described with reference to FIGS. 10 to 14. The imaging device according to the present embodiment differs from the imaging device according to the second embodiment in a shield plate 62 that replaces the shield plate 61. The present embodiment will be described focusing on its differences from the second embodiment. The same components as in the first or second embodiment will not be described.

Figure 10:
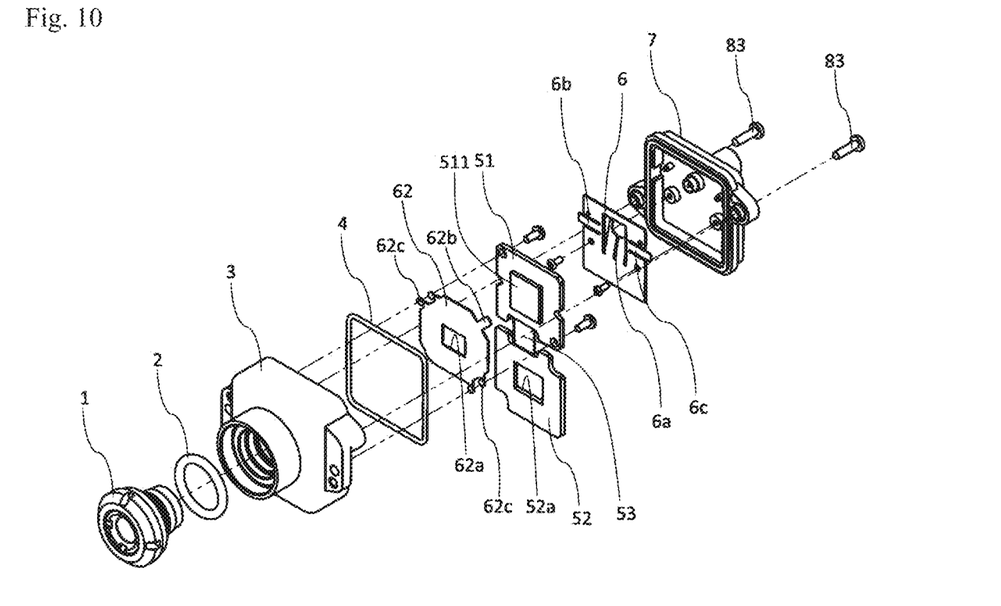
FIG. 10 is an exploded front perspective view of an imaging device according to a third embodiment.
Figure 11:
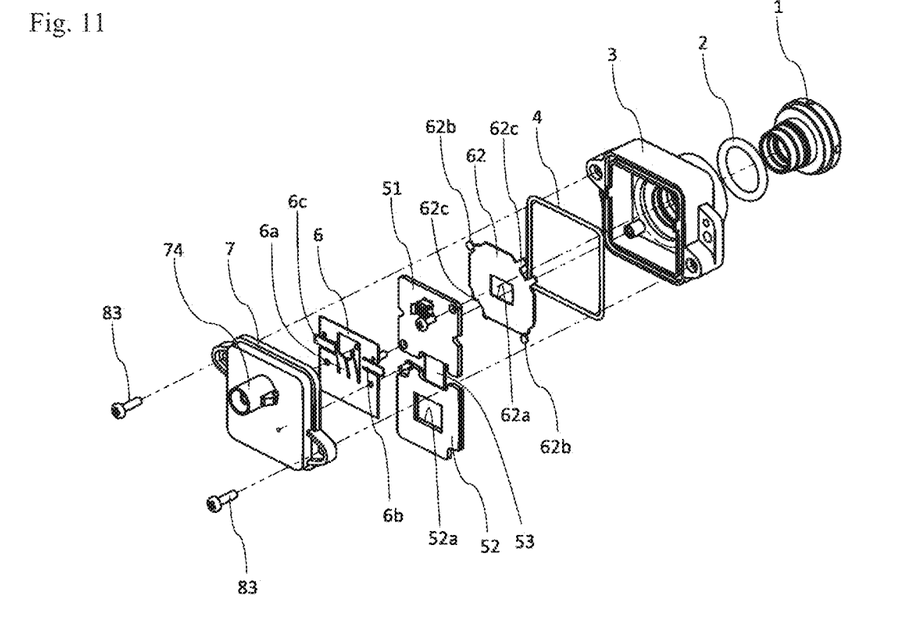
FIG. 11 is an exploded rear perspective view of the imaging device according to the third embodiment.
Figure 12:
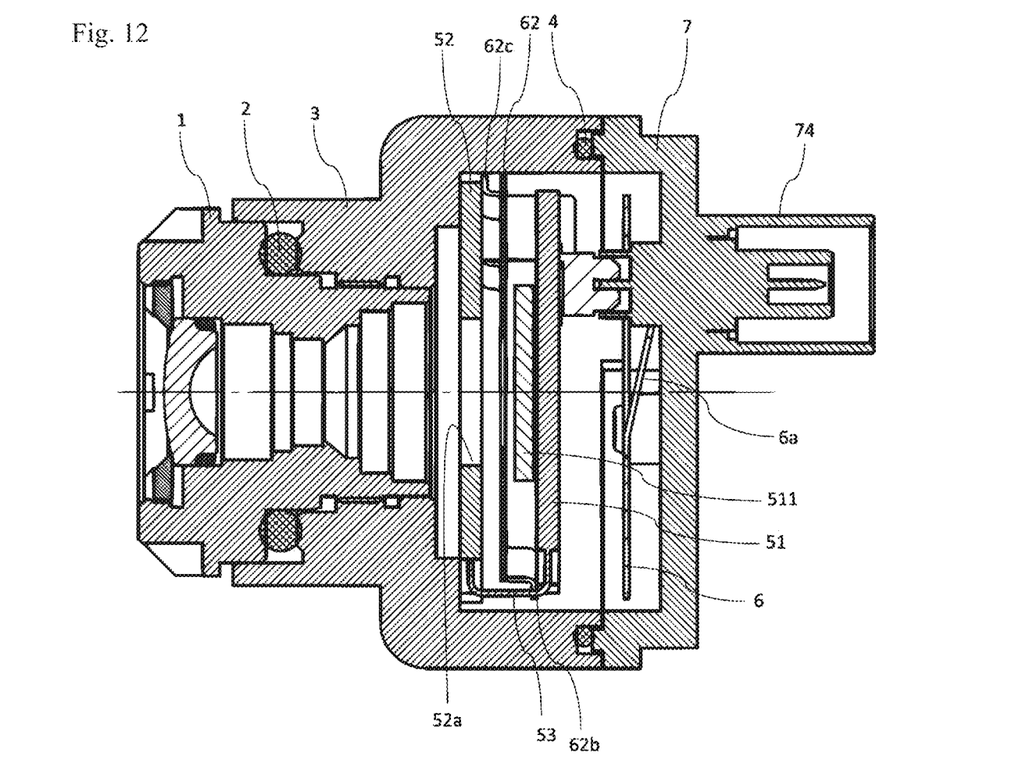
FIG. 12 is a cross-sectional view of the imaging device according to the third embodiment.
Figure 13:
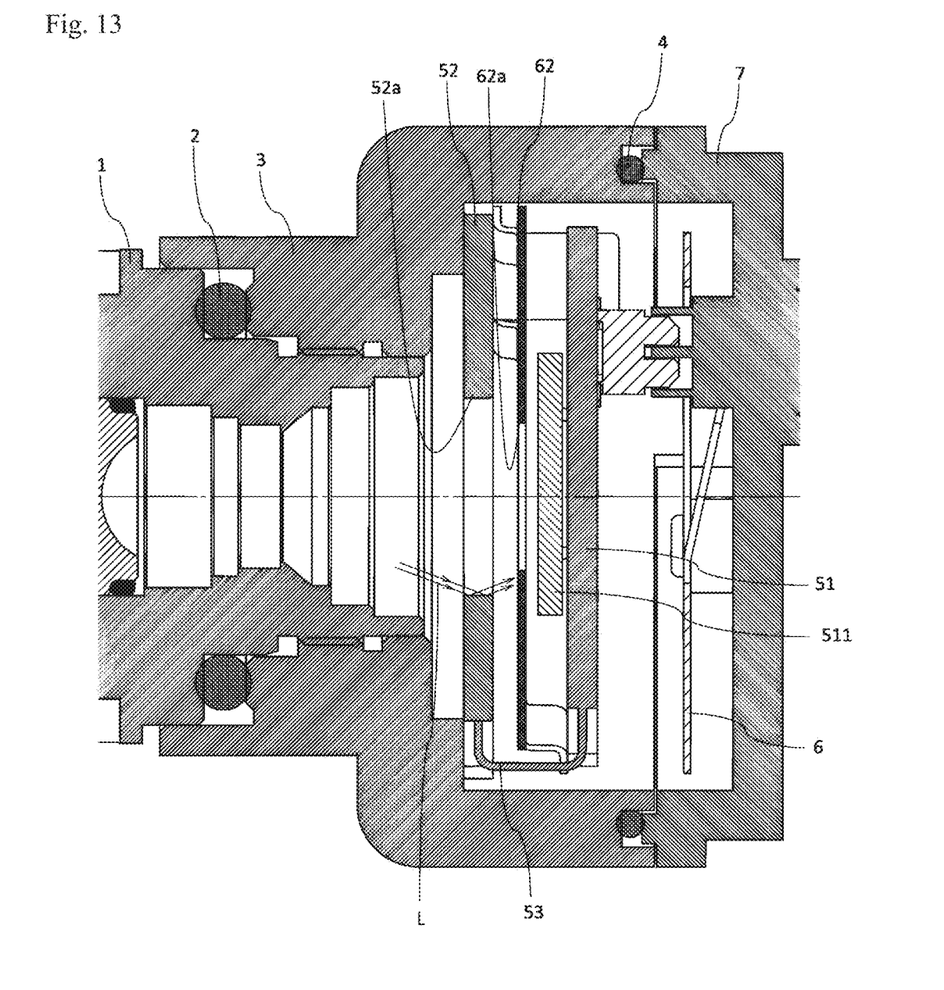
FIG. 13 is an enlarged cross-sectional view of the imaging device according to the third embodiment, showing a part near an opening.

FIGS. 10 and 11 are exploded perspective views of the imaging device. FIG. 10 is a front view, and FIG. 11 is a rear view. FIGS. 10 and 11 correspond to FIGS. 6 and 7 referred to in the second embodiment. FIG. 12 is a cross-sectional view of the imaging device according to the present embodiment. FIG. 13 is an enlarged view of a part near an opening 52a in FIG. 12.

As illustrated, the imaging device according to the present embodiment includes a lens barrel 1, a waterproof seal 2, a front case 3, a waterproof seal 4, a first substrate 51, a second substrate 52, a shield plate 6, a rear case 7, and the shield plate 62.

Shield Plate 62

The shield plate 62 differs from the shield plate 61 according to the second embodiment in that the shield plate 62 has an opening 62a smaller than the opening 61a and in that the shield plate 62 has its surface treated with anti-reflective surface treatment. The shield plate 62 includes leaf springs 62b and 62c corresponding to the leaf springs 61b and 61c on the shield plate 61. The opening 62a is an example of a second opening in an aspect of the present invention.

Similarly to the shield plate 61, the shield plate 62 is a metal plate having an opening 62a. The shield plate 62 has its two surfaces treated for preventing light reflection. Such surface treatment may be, for example, black coating or black anodizing treatment. The shield plate 62 may have its surface portion at the opening 62a treated with anti-reflective surface treatment.

The shield plate 62 in the above embodiment has its two surfaces treated with anti-reflective surface treatment. In some embodiments, the shield plate 62 may have either of its two surfaces treated with anti-reflective surface treatment. For example, the shield plate 62 may have its front surface (surface facing the second substrate 52) in the optical axis direction treated with anti-reflective surface treatment to reduce reflection of light incident on the front surface in the optical axis direction.

As shown in FIG. 13, light coming from the subject and passing through the lens or other components in the lens barrel 1 may be reflected at the edge of the opening 52a in the second substrate 52 when passing through the opening 52a. To block such reflected light, the opening 62a in the shield plate 62 is smaller than the opening 61a in the shield plate 61. More specifically, the opening 62a is formed to at least partially block light reflected on the edge of the opening 52a.

4. Features

The structures according to the embodiments of the present invention specifically described above have the features described below.

In the imaging device according to the embodiments of the present invention, the second substrate 52 located frontward from the first substrate 51 in the optical axis direction has the opening 52a. The image sensor 511 receives light passing through the lens and other components in the lens barrel 1 and the opening 52a. The imaging device with the above structure according to the embodiments of the present invention thus has a smaller dimension (thickness) in the optical axis direction than an imaging device including the second substrate 52 located rearward from the first substrate 51 in the optical axis direction.

In the imaging device according to the embodiments of the present invention, the opening 52a has the edge that allows, for the light passing through the lens or other components in the lens barrel 1, a portion of the light corresponding to an effective imaging region to be received by the image sensor 511. The imaging device with the above structure according to the embodiments of the present invention thus prevents light coming from the subject to form an image in the image sensor 511 from being blocked at the opening 52a. This allows clear imaging of the entire subject.

In the imaging device according to the embodiments of the present invention, the opening 52a is rectangular. This structure allows, for example, an appropriate portion of light corresponding to a rectangular imaging area to pass through the opening 52a.

In the imaging device according to another embodiment of the present invention, the shield plate 61 or 62 having the opening 61a or 62a is located between the first substrate 51 and the second substrate 52. This structure blocks electromagnetic noise generated from either the first substrate 51 or the second substrate 52 toward the other, thus reducing inappropriate, erroneous operations of the first substrate 51 and the second substrate 52 due to such electromagnetic noise.

In the imaging device according to the embodiment of the present invention, the shield plate 61 or 62 includes leaf springs 61b and 61c or leaf springs 62b and 62c. In the above structure, the shield plate 61 or 62 urges the first substrate 51 and the second substrate 52, stably positioning the first substrate 51 and the second substrate 52.

In the imaging device according to the embodiment of the present invention, the leaf springs 61b and 61c on the shield plate 61 or the leaf springs 62b and 62c on the shield plate 62 each urge the first substrate 51 or the second substrate 52 in the optical axis direction. In the above structure, the first substrate 51 and the second substrate 52 are urged away from each other. This structure stably positions the first substrate 51 and the second substrate 52.

In the imaging device according to the embodiment of the present invention, the shield plate 62 may have at least one surface treated with anti-reflective surface treatment. In the above structure, the shield plate 62 can reduce reflection of light, reducing ghosting flare or other artifacts appearing on the captured image due to light reflected on the shield plate 62.

In particular, the shield plate 62 with the above structure may have its front surface in the optical axis direction treated with anti-reflective surface treatment. In the above structure, the shield plate 62 can reduce reflection of light on its surface that may cause defects, thus reducing ghosting flare or other artifacts.

In the imaging device according to the embodiment of the present invention, the shield plate 62 has the opening 62a smaller than the opening 52a in the second substrate 52. In the above structure, the shield plate 62 can block, at the opening 62a, light not used to form an image, more effectively reducing ghosting flare or other artifacts.

5. Supplemental Examples

The embodiments and the features of the present invention are described above by way of example. The scope of the present invention is not limited to the above embodiments but is construed broadly within the scope understandable by those skilled in the art in accordance with the above embodiments.

For example, the imaging device according to each of the above embodiments includes the front case 3 and the rear case 7. However, the imaging device may have any other structure that includes a case as a housing. The structure without a case may exclude the front case 3 and the rear case 7.

The imaging device according to each of the above embodiments includes two rigid substrates, or specifically the first substrate 51 and the second substrate 52. However, the imaging device may include an additional rigid substrate. In that structure, the additional rigid substrate may be located more rearward than the first substrate 51 in the optical axis direction or frontward from the first substrate 51 in the optical axis direction. The additional rigid substrate may have an opening. The substrates may be flexible substrates in place of such rigid substrates.

The second substrate 52 may have one or two surfaces treated with anti-reflective surface treatment. The second substrate 52 may have its surface portion at the opening 52a treated with anti-reflective surface treatment. The second substrate 52 with its one or two surfaces treated with anti-reflective surface treatment can reduce reflection of light, thus reducing ghosting flare or other artifacts further.

The opening 52a (corresponding to the first opening in an aspect of the present invention) and the opening 61a (corresponding to the second opening in an aspect of the present invention) in the embodiment may be cutouts in the second substrate 52 and the shield plate 61. The cutouts may extend inward from the edges of the second substrate 52 and the shield plate 61. In that structure, the second substrate 52 and the shield plate 61 may each have a U shape or an L shape. The opening in an aspect of the present invention may be such a cutout.

The opening 52a and the opening 61a in the embodiment are not limited to rectangular openings, but may be circular, oval, or polygonal openings that allow passage of a portion of light corresponding to an intended area.

The second substrate 52 may be at any position frontward from the first substrate 51 in the optical axis direction, rather than between the first substrate 51 and the lens barrel 1. More specifically, the lens and other components may be held between the first substrate 51 and the second substrate 52.

INDUSTRIAL APPLICABILITY

The imaging device according to at least one embodiment of the present invention may be suitably used for an in-vehicle imaging device.

The invention claimed is:

1. An imaging device, comprising:
an image sensor configured to capture an image of a subject;
a first substrate on which the image sensor is mounted;
a second substrate located frontward from the first substrate in an optical axis direction, the second substrate having a first opening;
a lens, wherein the image sensor receives light passing through the lens and the first opening; and
a shield plate located between the first substrate and the second substrate, the shield plate having a second opening, wherein the shield plate includes leaf springs in contact with the first substrate and the second substrate and urging the first substrate and the second substrate.

2. The imaging device according to claim 1, wherein the first opening has an edge that allows, for the light passing through the lens, passage of a portion of the light corresponding to an effective imaging region to be received by the image sensor.

3. The imaging device according to claim 1, wherein the first opening is rectangular.

4. The imaging device according to claim 1, wherein the leaf springs each urge the first substrate or the second substrate in the optical axis direction.

5. The imaging device according to claim 1, wherein the shield plate has a surface treated with anti-reflective surface treatment.

6. The imaging device according to claim 5, wherein the shield plate has a front surface in the optical axis direction treated with anti-reflective surface treatment.

7. The imaging device according to claim 1, wherein the second opening is smaller than the first opening.

* * * * *